(12) United States Patent
Peck et al.

(10) Patent No.: US 9,950,470 B1
(45) Date of Patent: Apr. 24, 2018

(54) LINEAR HEAT SEAL DEVICE

(71) Applicants: Davis Peck, Edmond, OK (US); Jason Conway, Edmond, OK (US); Michael Tindill, Edmond, OK (US)

(72) Inventors: Davis Peck, Edmond, OK (US); Jason Conway, Edmond, OK (US); Michael Tindill, Edmond, OK (US)

( * ) Notice: Subject to any disclaimer, the term of this patent is extended or adjusted under 35 U.S.C. 154(b) by 0 days.

(21) Appl. No.: 15/731,266

(22) Filed: May 15, 2017

(51) Int. Cl.
  *B32B 37/00* (2006.01)
  *B29C 65/00* (2006.01)
  *B29C 65/22* (2006.01)

(52) U.S. Cl.
  CPC ........ *B29C 66/0342* (2013.01); *B29C 65/224* (2013.01); *B29C 66/0242* (2013.01); *B29C 66/347* (2013.01); *B29C 65/222* (2013.01); *B29C 66/71* (2013.01); *B29C 66/81821* (2013.01)

(58) Field of Classification Search
  CPC .............. B29C 66/0342; B29C 66/224; B29C 66/0242; B29C 66/347
  USPC .............................. 167/359, 498, 579, 583.1
  See application file for complete search history.

(56) References Cited

U.S. PATENT DOCUMENTS

| 3,106,630 | A | 10/1963 | Klamp |
| 3,477,196 | A | 11/1969 | Lerner |
| 4,013,860 | A | 3/1977 | Hosterman |
| 4,650,535 | A | 3/1987 | Bennett |
| 6,779,575 | B1 * | 8/2004 | Arthun .............. B01L 3/505 156/515 |
| 7,810,540 | B2 * | 10/2010 | Chang ............... B26B 27/00 156/515 |

* cited by examiner

*Primary Examiner* — James Sells
(74) *Attorney, Agent, or Firm* — Randal D. Homburg

(57) ABSTRACT

A liner heat sealing device used to fuse two or more sheets of plastic or vinyl together along a straight line using a heating element and a temperature control unit to control the temperature of the device, the device having three separate temperature zones along a linear axis, including a front preheating segment, a central fusing segment and a rear cooling section, each section provided on the common linear sealing device.

4 Claims, 14 Drawing Sheets

LINEAR HEAT SEAL DEVICE

I. BACKGROUND OF THE INVENTION

1. Field of Invention

A liner heat sealing device used to fuse two or more sheets of plastic or vinyl together along a straight line using a heating element and a temperature control unit to control the temperature of the device, the device having three separate temperature zones along a linear axis, including a front preheating segment, a central fusing segment and a rear cooling section, each section provided on the common linear sealing device.

2. Description of Prior Art

A preliminary review of prior art patents was conducted by the applicant which reveal prior art patents in a similar field or having similar use. However, the prior art inventions do not disclose the same or similar elements as the present linear heat sealing device, nor do they present the material components in a manner contemplated or anticipated in the prior art.

In U.S. Pat. No. 4,650,535 to Bennett and U.S. Pat. No. 3,106,630 to Klamp, a machine uses a lid and a flat base to fuse sheet plastic together for a shrink wrap fit and also to laminate two pieces of sheet material together to seal contents within the plastic. They are not hand held device, they do not provide three heat/cool zones on a common linear sealing device, and they do not operate using any of the components used in the present linear heat sealing device.

U.S. Pat. No. 3,477,196 to Lerner is a device used to feed, load and seal bags into proportional packages, using a linear heat seal in a closing section, this heat sealer has a fixed sealing member mounted on a seal frame, the fixed sealing member providing a hot wire energized at an appropriate time in the cycle for effecting a heat seal, with a clamp bar pressing the plastic against the heat seal. The sealed section is then passed to a cooling passage in the heat seal bar, but there is nothing mentioned about how this works, other than it is described as a cooling passage. It also mentions control circuits to operate the entire machine, as well as to time the heat sealer to operate at a given time in the cycle. The sealing occurs when the plastic is between the sealer arm and the clamp bar. These elements and operation are not common the present linear heat sealing device that is simply a plate with three segmented temperature zones that is used, very similar to a flat iron, to operate by hand, pressing the plate against plastic or vinyl heating the sheets, fusing the sheets together and cooling the fused section during a linear movement of the device along the linear axis.

A singular hand held device is demonstrated in U.S. Pat. No. 4,013,860 to Hosterman is used to weld tubing between a pair of jaws using a variable capacitor of an Rf resonant circuit. It press seal tubing, most commonly applied to tubing to provide a hermetic seal in the tubing, welding it without melting it. This is used primarily for tubing in a blood collection bag. A handle is drawn towards a body which bring a pair of jaws together. These jaws coming together applied pressure to the tubing while Rf energy heats these jaws to fuse the plastic tubing together. It operates a would a pair of heated pliers. The complex circuitry involved in the Hosterman is shown in FIG. 6. These electronic components are not involved in the present linear heat seal device and there is no pinching involved in the operation of the present device.

II. SUMMARY OF THE INVENTION

Fusing sheet materials together to form a seal is conducted using heat on some type of a machine or device. It is usually performed by placing the sheet materials between at least one heating element and a base, introducing heat to the heating element, and releasing the material from between the components of the machine. With the except on Hosterman, the materials are introduced into the machine.

Often, it is inconvenient to transfer two sheet to a device and keep them in proper alignment. The present linear heat seal device provides a hand-held and portable device which can be brought to any location where one or more sheets of plastic or vinyl may be laid flat, with the hand-held device being used as a flat iron to introduce the seal to the at least two sheet of material from one surface to create a liner seal between the two sheets at whatever contour or shape is desired by the user. It is also capable of presenting more than one seal between the at least two sheets, to create pocket seals, or to present multiple linear seals. It can also be used to provide multiple sheets attached periodically to one another to apply several shaped sheets of material with a variety of seals.

III. DESCRIPTION OF THE DRAWINGS

The following drawings are submitted with this utility patent application.

IV. DESCRIPTION OF THE PREFERRED EMBODIMENT

A hand-held linear heat sealing device 10, shown in FIGS. 1-14 of the drawings, is used to fuse at least two sheets of plastic or vinyl A together along a linear seam, the linear heat sealing device 10 providing a lower surface 58 defining a pre-heating zone, wherein the plastic or vinyl becomes soft and tacky, a heating zone, wherein the plastic or vinyl sheets are melted together to complete the fusion of the sheets of plastic or vinyl, and a cooling zone, wherein the fused plastic is cooled down to return the plastic or vinyl into a hardened finished state. The hand-held application of the device 10 is presented to the plastic or vinyl sheets A on any flat surface wherein the sheets are held stationary, unlike stationary laminating devices that require the sheets to be moved through the stationary machine.

Figure 1:
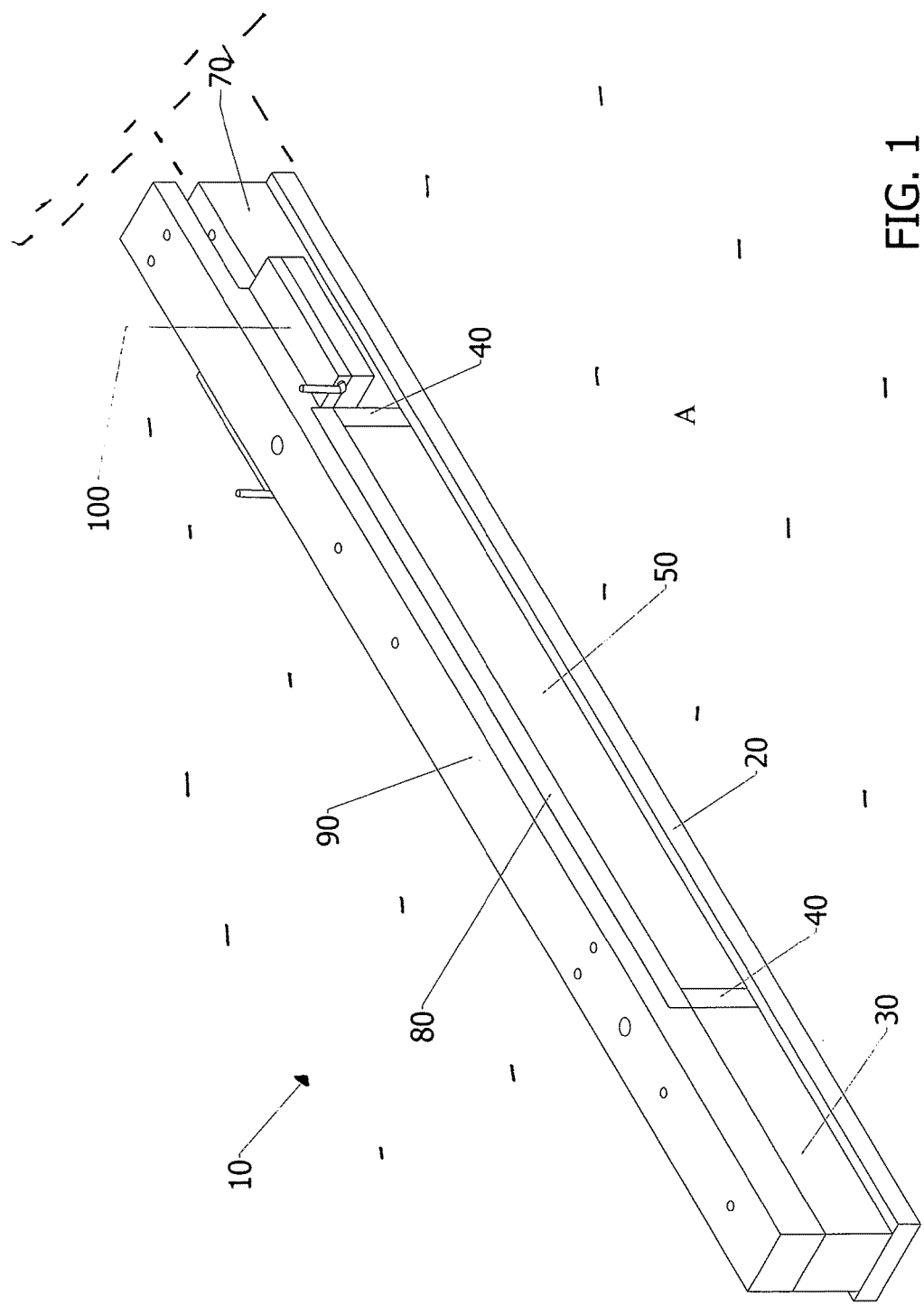
FIG. 1 is a perspective view of the linear heat seal device on two sheets of plastic or vinyl.
Figure 2:
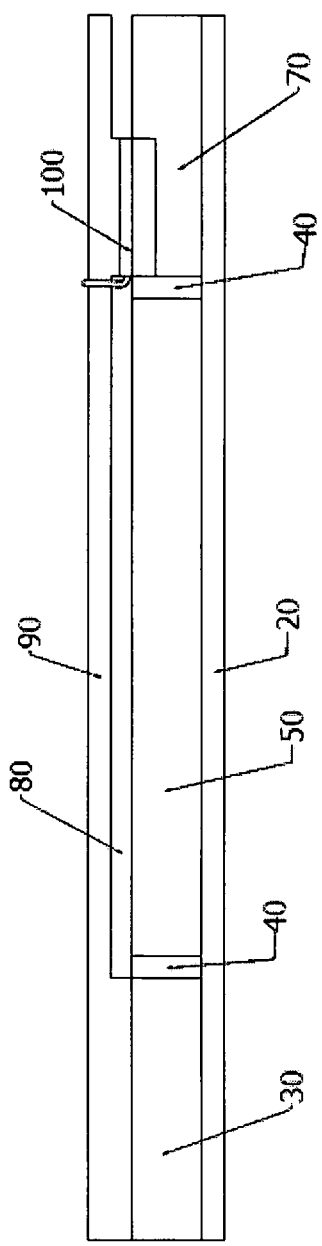
FIG. 2 is a side view of the linear heat sel device.
Figure 14:
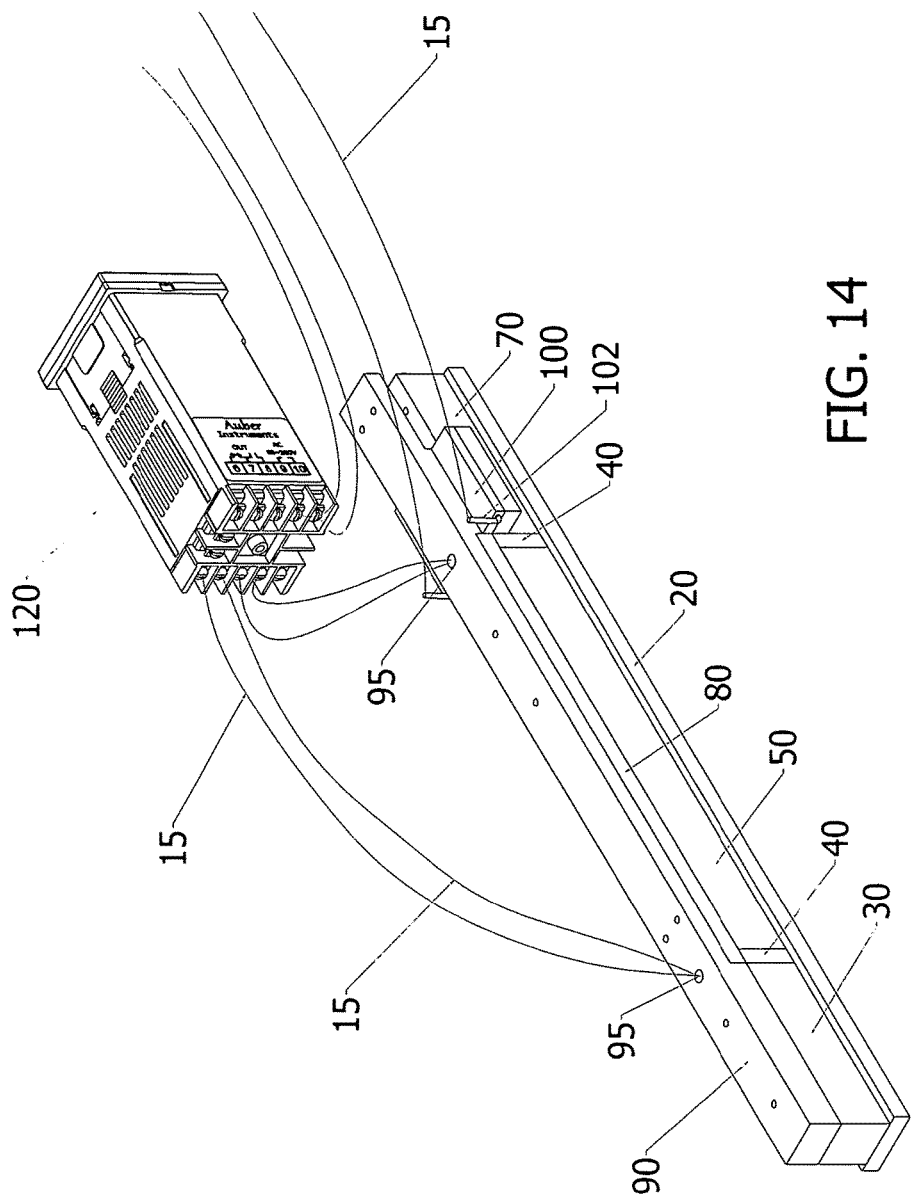
FIG. 14 is a view of the linear heat seal device connected to the remote temperature controller unit.

The hand-held linear heat sealing device 10, as shown assembled in FIGS. 1-2 and 14, comprises a contact bar 20, a preheating base 30, a heat base 50, a first insulator block 40 between the preheating base 30 and the heat base 50, a cooling base 70, a second insulator block 40 between the heat base 50 and the cooling base 70, the preheating base 30, heat base 50 and cooling base 70 aligned above and attaching to the contact bar 20, a heating element 60 located within the heat base, a temperature probe 130 to monitor the heat base 50 temperature, an insulating strip 80 above the heat base 50 bridging the insulator blocks 40, a thermoelectric cooling device (TCD) 100 located above the cooling base 70, a top bar 90 extending across the device 10 from the preheating base 30 extending across to the thermoelectric cooling device 100, and a temperature controller 120 attaching by wires 15 to the heating element 60 to regulate, monitor and control the temperature of the heat base 50 during use, the temperature adjusted to the thickness, texture and type of material in the plastic or vinyl sheets A being fused.

For purposes of this specification, the plastic or vinyl sheets A will be collectively referenced as "plastic sheets" (identified by reference as "A") for the remainder of this application, but is intended not to limit the scope of the materials being fused, but to extend the scope of the materials to include any fusible plastic, vinyl, polymeric or other sheet materials that can be heat fused together along a linear seam, regardless of thickness, texture or composition of the materials.

The components of the linear heat seal device 10 are more specifically shown in FIGS. 3-13 of the drawings and represent preferred embodiments of the device components that assemble in a compact and hand-held device in a manner for each component to work effectively and efficiently and as further disclosed herein. While the components may take a different shape, size or configuration than shown, the basic elements of the components as shown represent those which were found useful and effective in the disclosed orientation and assembly manner as indicated in the drawings. However, the drawings are not intended to limit the scope each component, but to demonstrate a most effective mode of size, shape and design effecting the optimal operational aspects of each component.

Figure 3:
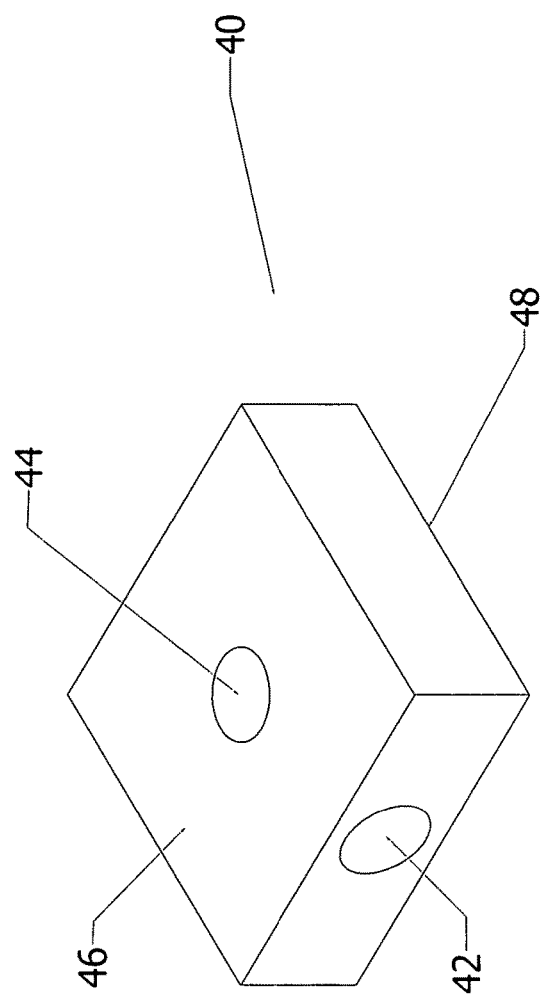
FIG. 3 is a perspective view of an insulator block.
Figure 5:
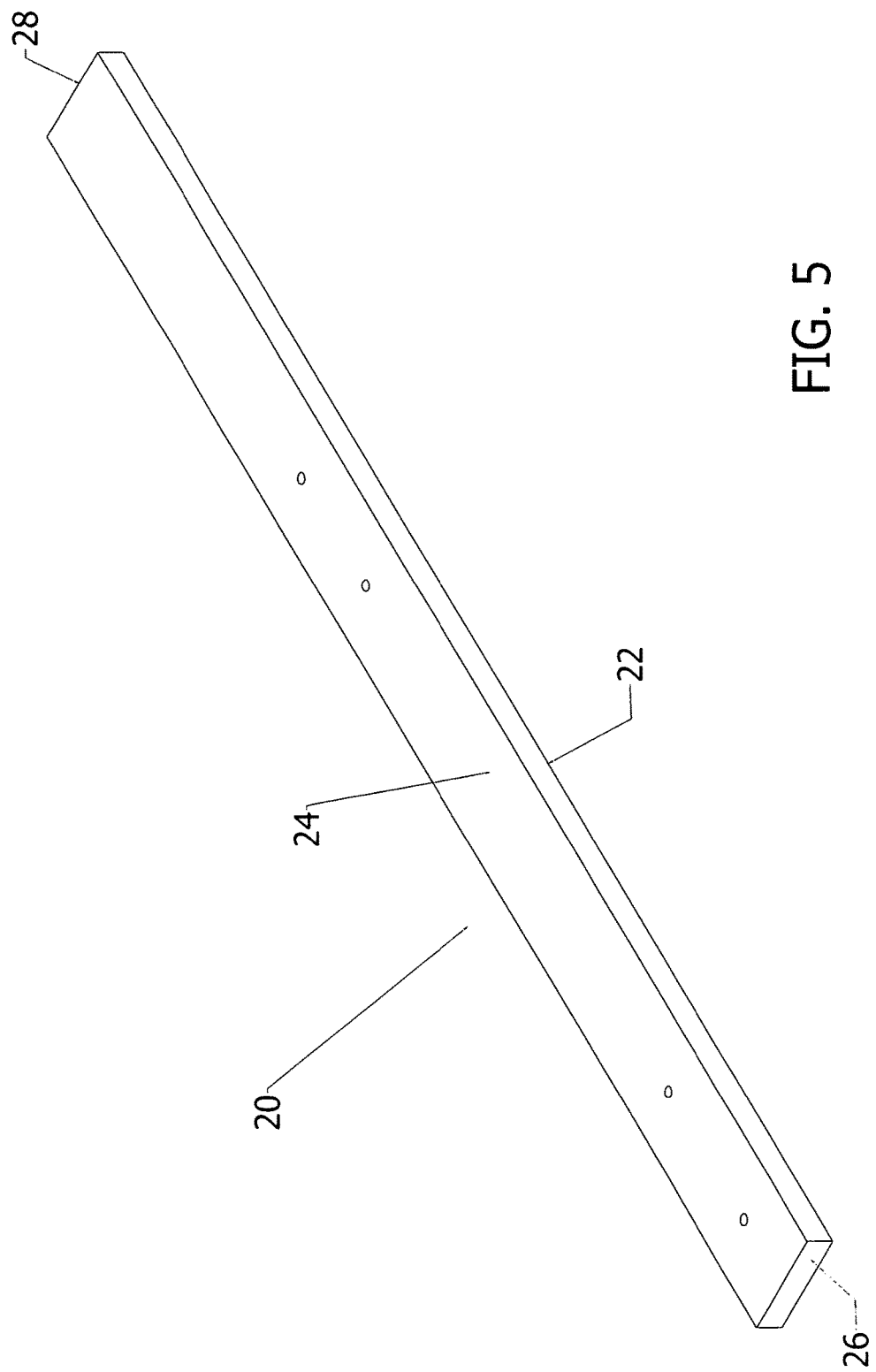
FIG. 5 is an upper perspective view of the contact bar.
Figure 6:
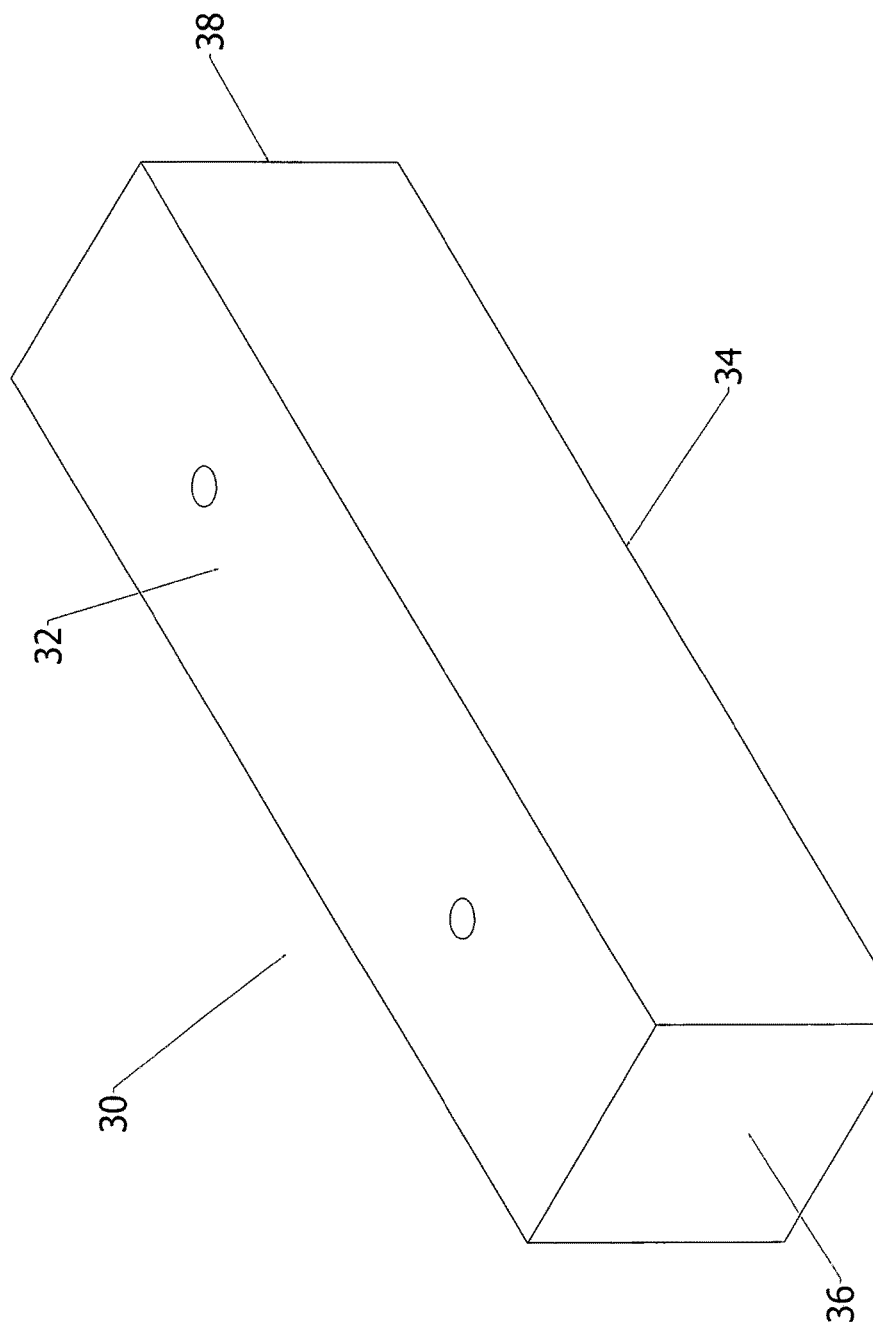
FIG. 6 is an upper perspective front view of the preheating base.
Figure 7:
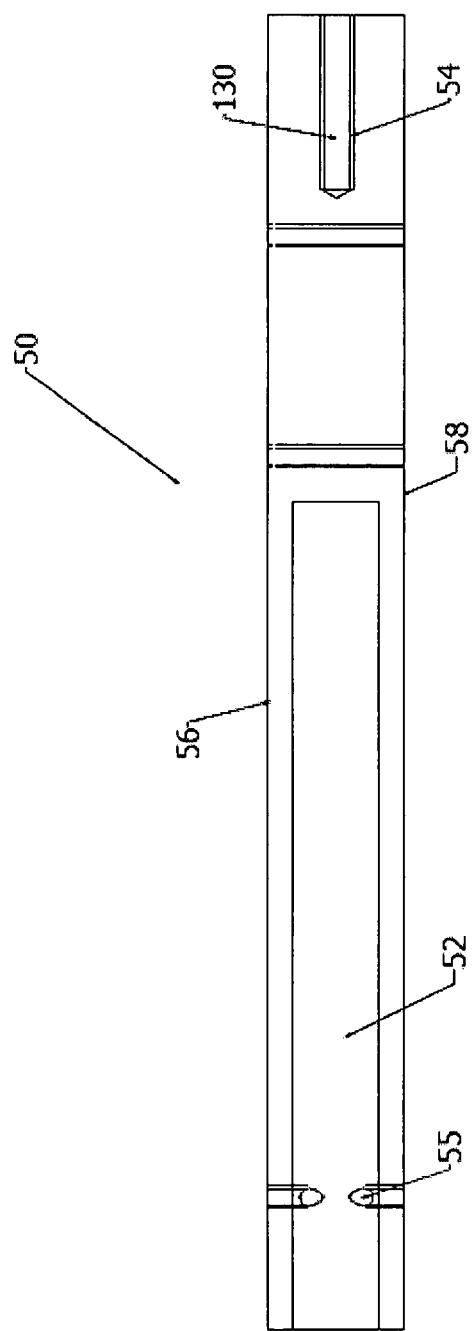
FIG. 7 is a side cross-sectional view of the heat base.
Figure 8:
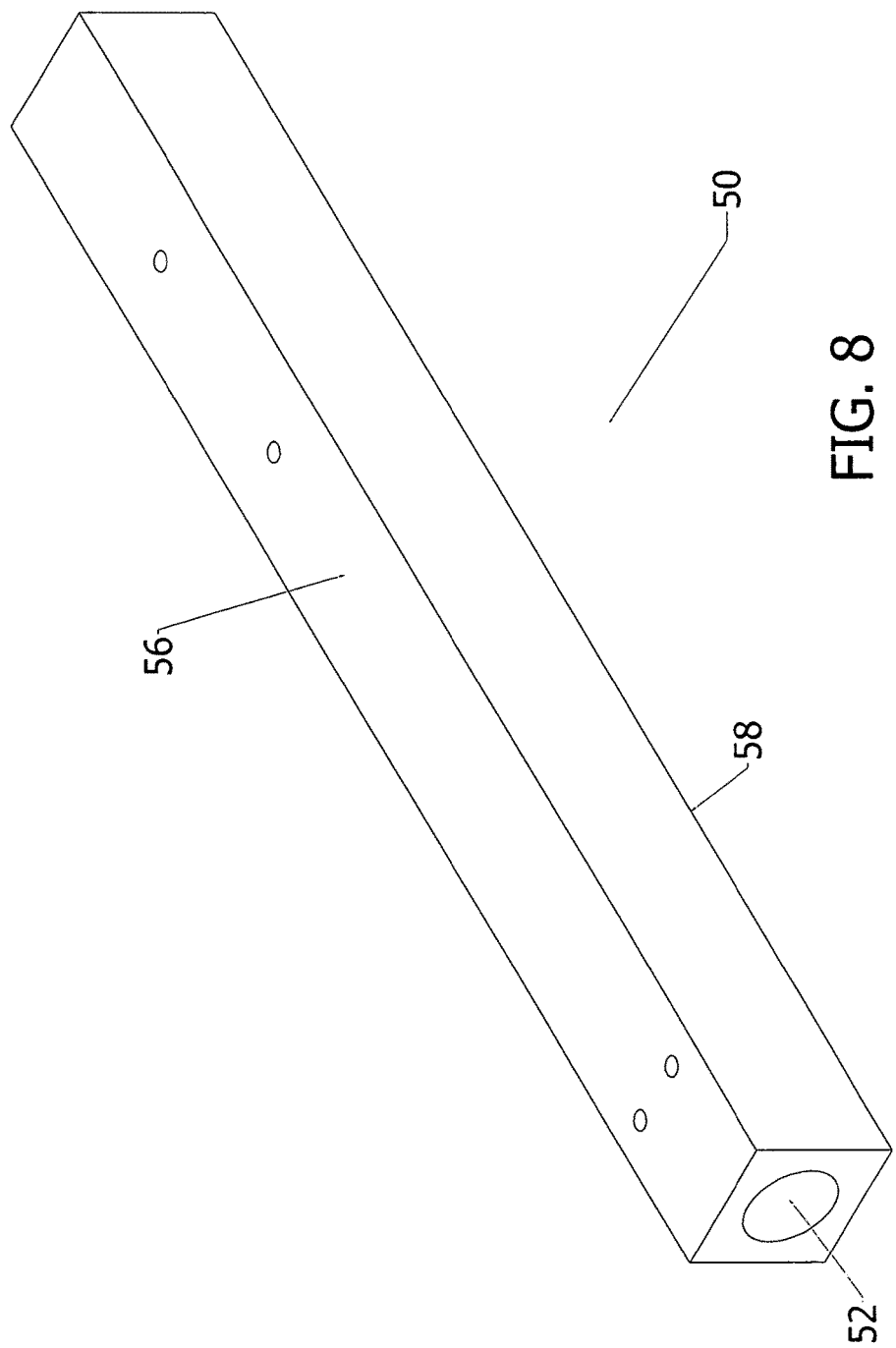
FIG. 8 is an upper front perspective view of the heat base.

The contact bar 20, as shown in FIG. 5, defines a lower surface 22, an upper surface 24, a front end 26 and a rear end 28. The lower surface 22 of the contact bar is the only portion of the device 10 which has contact with the at least one sheet of plastic sheets A. The preheating base 30, shown in FIG. 6, defines an upper surface 32, a lower surface 34, a front end 36, and a rear end 38. The preheating base 30 attaches above the contact bar 20 at the front end 26 of the contact bar 20. A first insulator block 40, shown in FIG. 3, is preferably made of nylon or other heat insulating polymer, and defines an upper element bore 42 intersecting an axial bore 44, a front surface 46 and a rear surface 48. The first insulator block 40 is attached above the contact bar 20 against the rear end 38 of the preheating base 30. The heat base 50, shown in FIGS. 7-8, defines a front heating core cavity 52 aligned with the axial bore 44 of the first insulator block 40, a rear temperature probe cavity 54, an upper surface 56 and a lower surface 58. The lower surface 58 attaches to the upper surface 24 of the contact bar 20 behind and against the rear surface 48 of the first insulator block 40.

Figure 9:
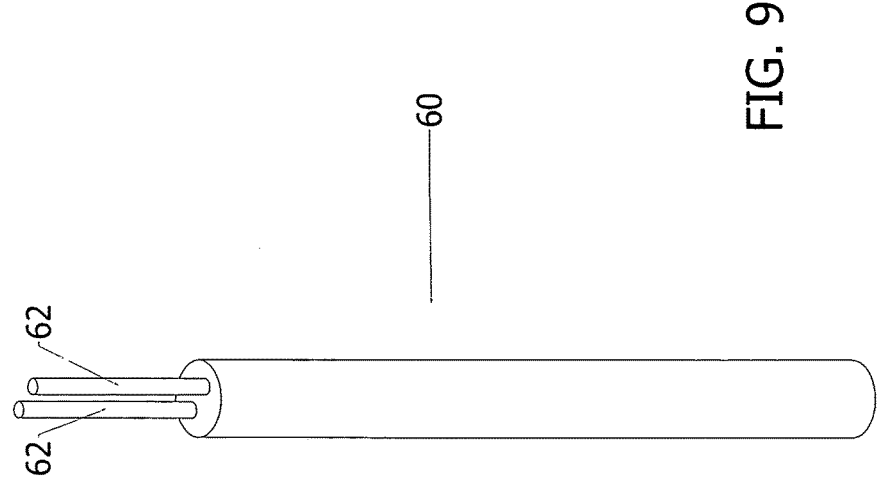
FIG. 9 is a view of a heating element.
Figure 10:
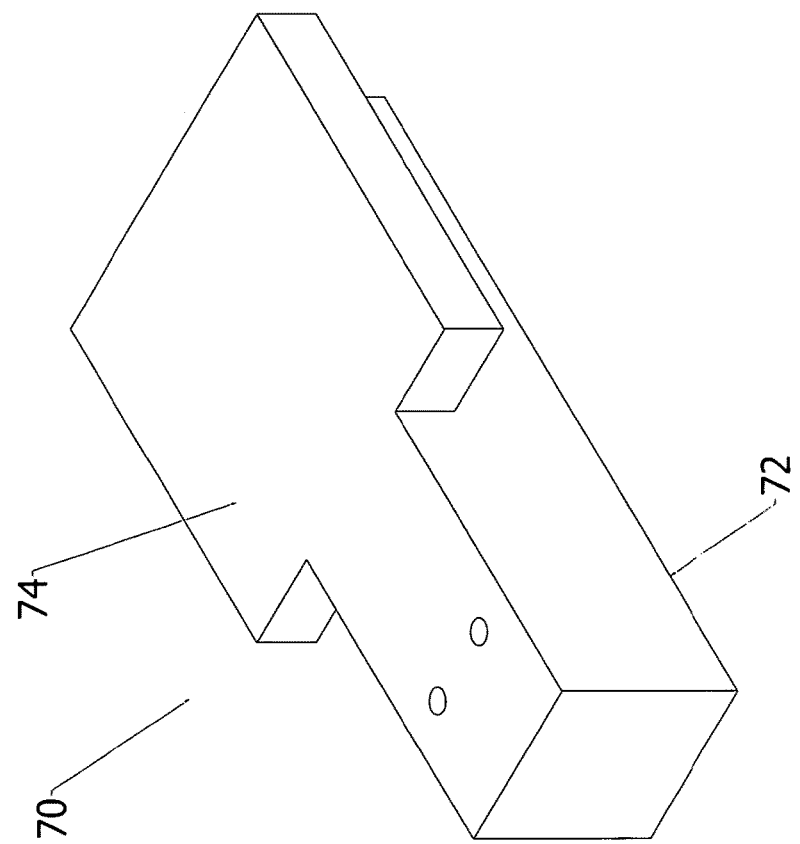
FIG. 10 is an upper front perspective view of the cooling base.
Figure 11:
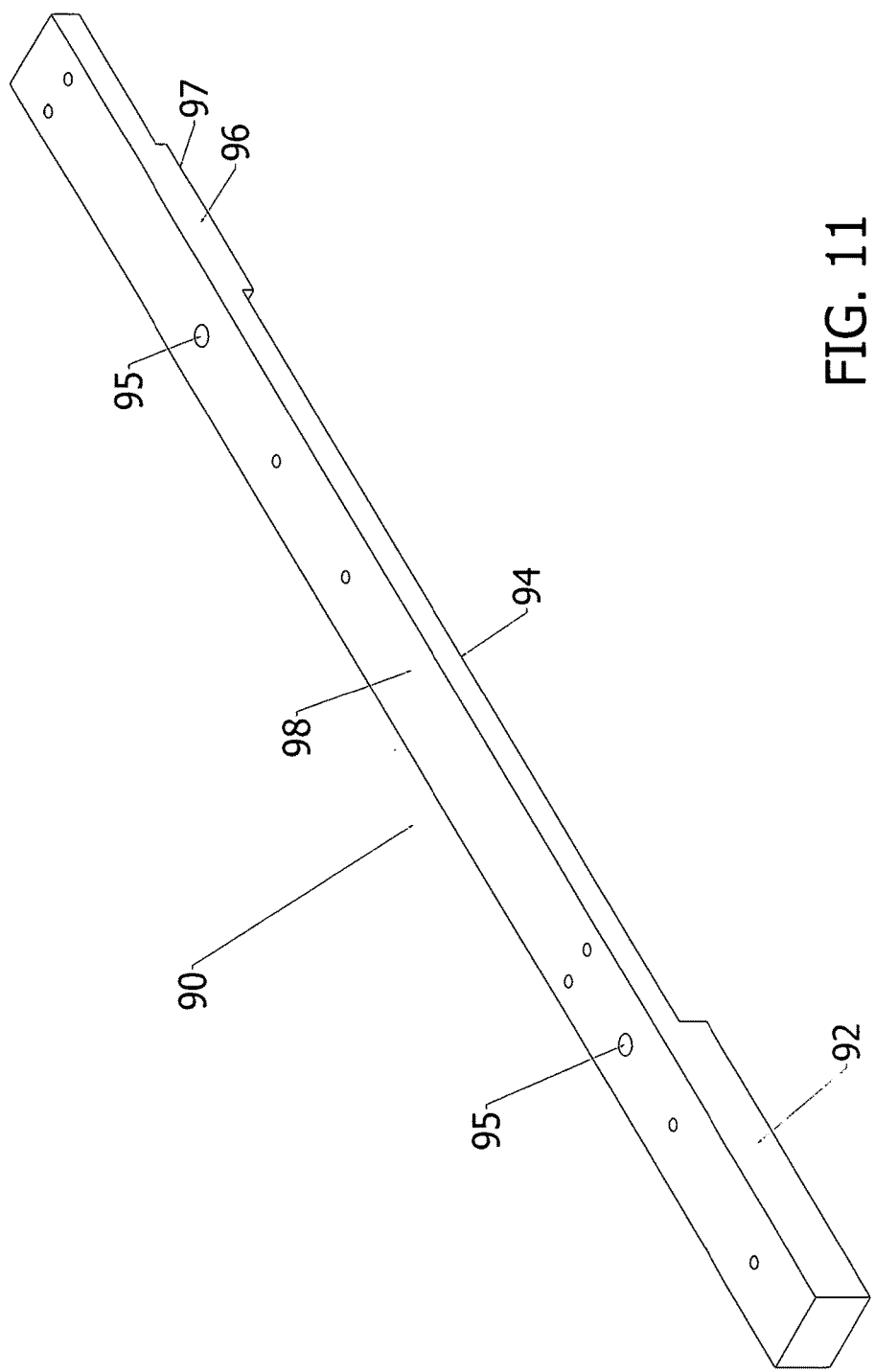
FIG. 11 is an upper perspective view of the top bar.
Figure 12:
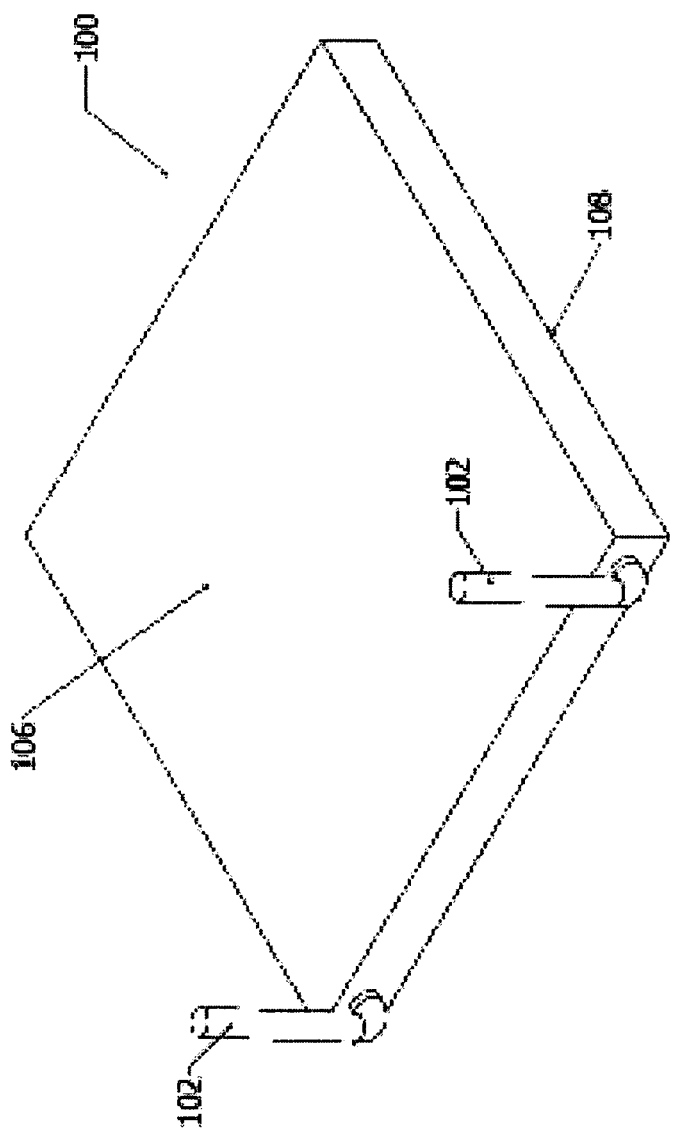
FIG. 12 is an upper perspective view of a Peltier thermoelectric cooling device.
Figure 13:
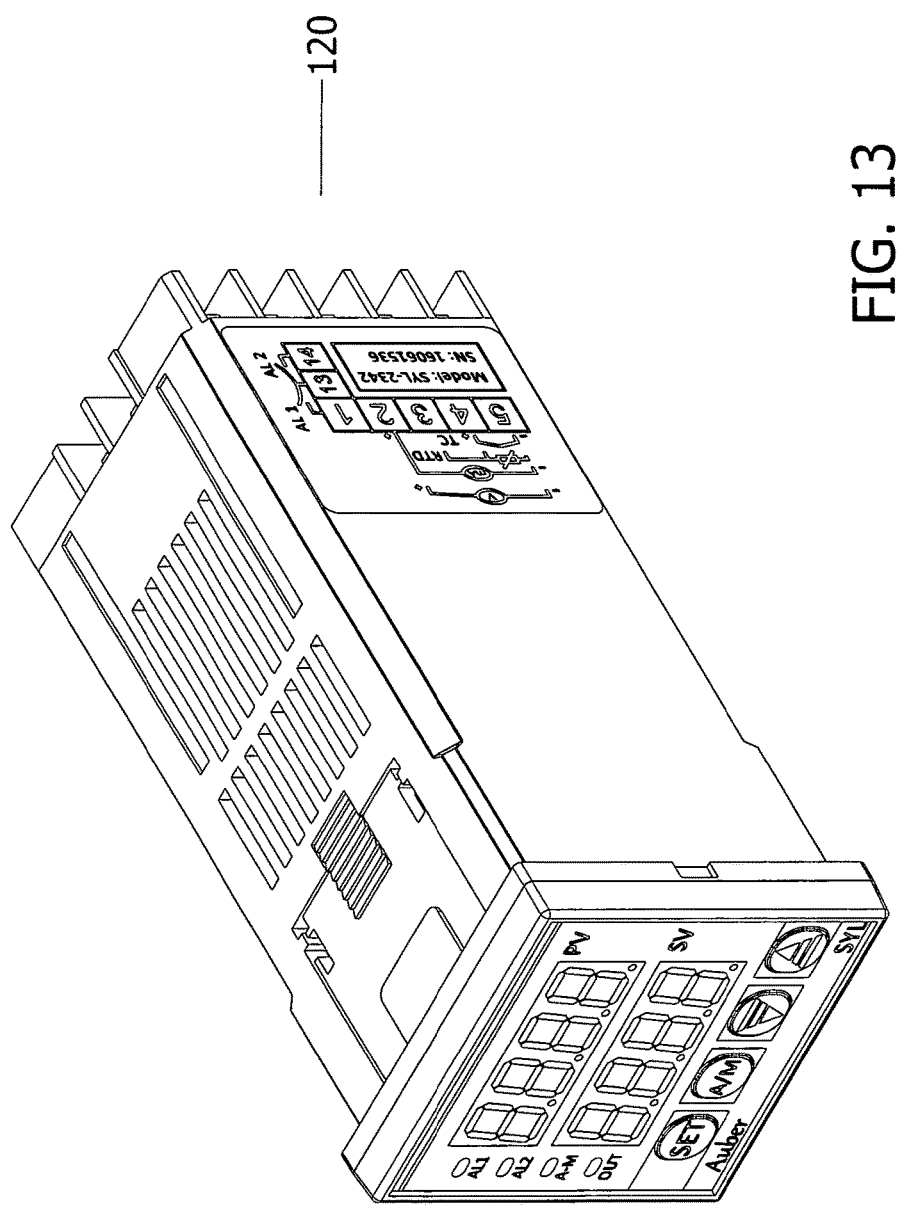
FIG. 13 is a perspective view of a remote temperature controller unit.

Within the front heating core cavity 52 is a heating element 60, as shown in FIG. 9. The rear temperature probe cavity 54 contains a temperature probe 130. A second insulating block 40, FIG. 3, is presented behind the heat base 50 above the contact bar 20, the second insulating block 40 also defining an upper element bore 42 intersecting an axial bore 44, a front surface 46 and a rear surface 48, and is made of the same material as used in the first insulator block 40. The axial bore 44 of the second insulator block 40 is aligned with the rear temperature probe cavity 54. Attaching to the rear surface 48 of the second insulator block 40 is the cooling base 70, FIG. 10, the cooling base 70 defining a lower surface 72 attaching to the contact bar 20 at the rear end 28, the cooling base 70 further defining an enlarged upper cooling exchange platform 74. The preheating base 30, heat base 50 and cooling base 70 are made of a heat conductive material, preferably metal, as is the contact bar 20, with the intent to conduct thermal energy as directed by the component function.

Figure 4:
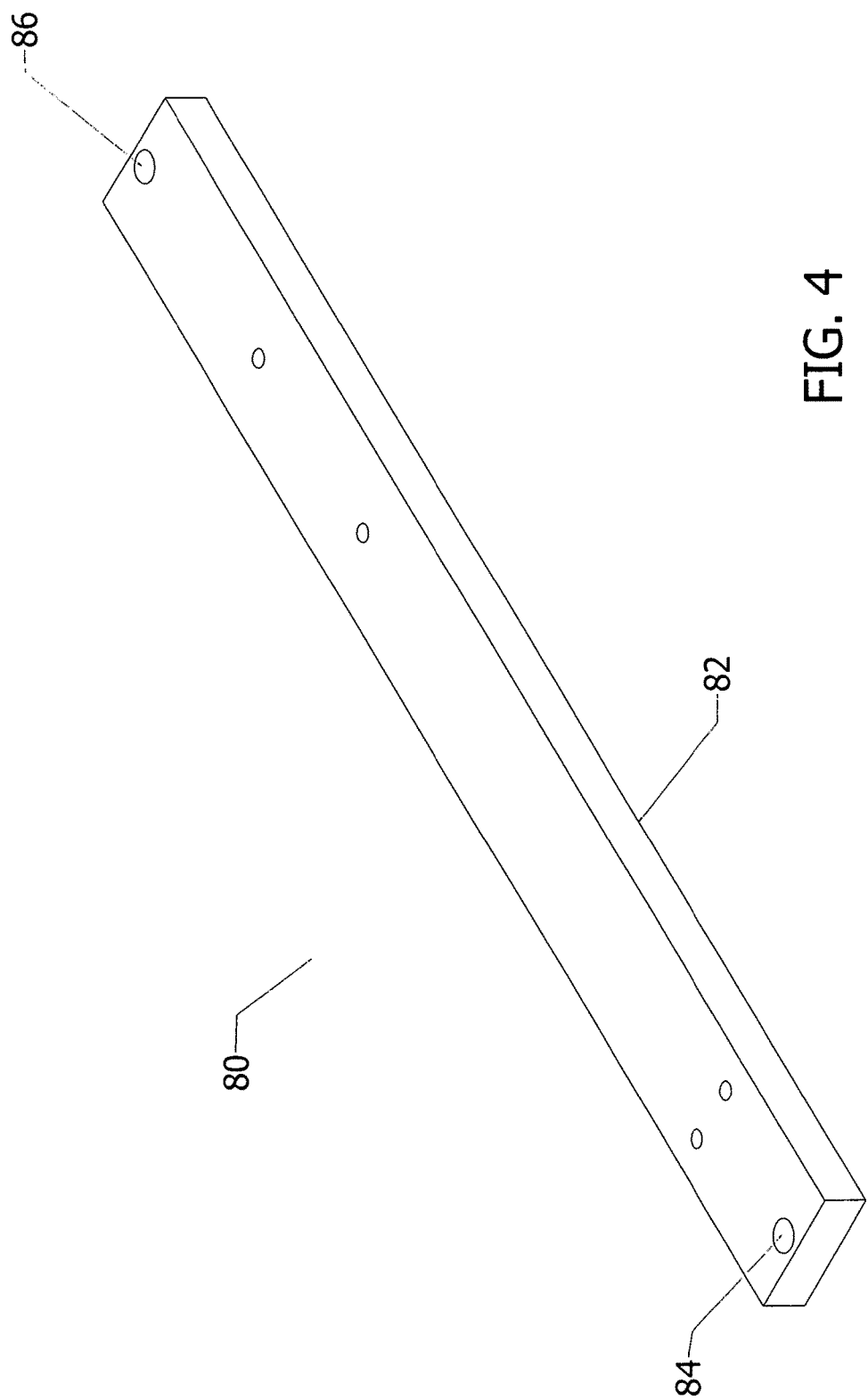
FIG. 4 is an upper perspective view of the insulating strip.

A lower surface 82 of an insulating strip 80, FIG. 4, is placed above the upper surface 56 of the heat base 50, spanning across the first insulator block 40 to the second insulator block 40, the insulating strip 80 defining a front element wiring port 84, aligning with the upper element bore 42 of the first insulator block 40 and a rear element wiring port 86, aligning with the upper element bore 42 of the second insulator block 40. This insulator strip 80 is intended to prevent heat from the heat base 50 from exiting the upper surface 56 of the heat base 50, instead directing the heat from the heat base 50 to the lower surface 58. A top bar 90 is extends above the preheating base 30, the insulating strip 80 and over the cooling base 90, leaving a gap between the cooling base 70 and the top bar 90 for the inclusion of the thermoelectric cooling device (TCD) 100, as shown in FIGS. 1-2 and 14. The top bar 90 defines a front section 92, extending to contact upper surface 24 of the preheating base 30, an insulating strip recess 94, within which the insulating strip 80 is placed with wiring outlets 95 located above the front element wiring port 84 and the rear element wiring port 86 of the insulating strip 80, the top bar 90 further defining a rear lower surface 97, and an upper surface 98.

The thermoelectric cooling device (TCD) 100, FIGS. 1-2, 12 and 14, further defines two heat exchange wiring extensions 102, an upper surface 106 and a lower surface 104. This TCD 100 uses a Peltier effect to create a heat flux between the junction of two different types of material. A Peltier cooler is a solid-state active heat pump which transfers heat from one side of the device to the other, with consumption of electrical energy, depending on the direction of current. The TCD 100 is also known as a Peltier device, Peltier heat pump, solid state refrigerator or thermoelectric cooler (TEC). The application within the present device 10 is to cool the cooling base and the upper cooling exchange platform, through the lower surface 104 upon which the TCD 100 rests. The TCD 100 is the preferred component in the present device because is has no moving parts, no circulating fluids, has a long life, is invulnerable to leaks, is a small size and provides a flexible shape, suited for application within the present linear heat sealing device 10. The TCD 100 is independently connected to electrical power, as indicated in FIG. 14. It is not the intent of the TCD 100 to actually refrigerate the cooling base 70, but to reduce the temperature of the lower surface of the cooling base 70 in contact with the rear end 28 of the contact bar 20 at a temperature low enough to halt the melting and fusion process generated by the heat base 50 fusing the at least two plastic sheets A along a common linear axis. The upper surface 106 of the TCD 100 heats up as the lower surface 104 cools, with the heat generated by the upper surface 106 in contact with the rear lower surface 97 of the top bar 90 transferring convection heat to the preheating base 30. The top bar 90 is provided to transfer generated moderate heat from the TCD 100 to the preheating base 30 without transferring any melting heat from the heat base 50 below the insulation strip 80. It is segregated and also preferably made of a thermal conductive material, similar to or the same as the heat base 50, preheating base 30 and cooling base 70.

Although not shown in the drawing figures, the top bar 90 may include upper extensions, knobs or handles for hand placement, or may involve topographical extensions formed into the upper surface 98 of the top bar 98 for operational hand placement. If not, the device 10 should be used only with a thermal insulating glove to prevent the user from burning themselves during use. It is also contemplated, and also not shown, that the entire device 10 is provided with a heat insulating cover surrounding the entire device, while exposing only the lower surface 22 of the contact bar 20, encasing the device 10 on all lateral, front, rear and top sides. This would be a safety modification to prevent contact with the skin by the heat base 50 and preheat base 30 which might be a burn hazard to a user.

Electrical wiring 15, shown in FIG. 14, is inserted respectively through each wiring outlet 95 of the top bar 90, the aligned respective front and rear element wiring ports 84, 86 of the insulating strip 80, through the axial bore 44 of the respective first and second insulator block 40 and attaching to wiring contacts 62 located on the heating element 60, located within the front heating core cavity 52 in the heat base 50 and the temperature probe 130 located within the rear temperature probe bore 54 of the heat base 50. The wiring is connected to the temperature controller 120 which controls the amount of heat of the heating element 60 and the temperature reading of the temperature probe 130 during operation of the linear heat sealing device 10, the temperature controller 120 allowing for a chosen variable temperature of the heating element 60 as dictated by the composition of the at least two plastic sheets A requiring a linear seal.

The temperature controller 120 operates to control and monitor the heating element 60 of the device 10 and monitor the heat of the heat base 50 through the temperature probe 130. It is not a device unique to the present linear heat sealing device 10, but is a useful means of operating the device 10 and provide reliable heat management of the device 10. Several different temperature controllers were found that would provide the necessary required characteristics of one which would be ideally suited for use with the present linear heat sealing device, including a WATLOW® EZ-ZONE PM Express Controller, a HONEYWELL® UDC2500 Universal Digital Controller, a PARTLOW® 1161+ Limit Controller, or several other available models sold by WATLOW®, HONEYWELL®, YOKOGAWA®, WEST®, and PARTLOW®.

The attachment of the above assembled components, wherein the parts shown in FIGS. 3-12 are placed together to form the device 10 as shown in FIGS. 1-2, is done by either a high temperature adhesive, by screws, nuts and bolts or pins. Assembly may be provided as a manufactured unified device not subject to disassembly, or it may be fastened together in a manner which would allow disassembly. When used, the temperature controller 120 would be set to heat the heat base 50 to a temperature suited for the fusion of two sheets of material, which would vary, as indicated above, by the type of material, its thickness, and its composition matrix (i.e. vinyl coated canvas, vinyl coated nylon, plastic coated cotton, etc). The selection is similar to that of a flat iron used to iron clothing, except for the purpose of fusing sheets of material together to form a sealed seam. Contemporaneously, the TCD 100 is also activated by plugging it in to operate the TCD 100, which causes the upper surface 106 to receiver heat from the lower surface 104 making the lower surface "cool", providing the function to both the preheating base 30 for heat and the cooling base 70 for production of a cooling temperature to the regional lower surface 22 of the contact bar 20.

In operation, the linear heat sealing device 10, when run along a line over at least two plastic sheets A first softens the plastic sheets below the preheating base 30 on the contact bar 20, melts and fuses the at least two plastic sheets A below the heat base 50 on the contact bar 20, and then cools the fused plastic below the cooling base 70 on the contact bar 20, all along a common linear alignment using a common singular device 10. Although the linear heat sealing device 10 is described as "linear", that term is intended as a defining term to describe the device 10 and not necessarily the seal created by the device. The user has the liberty to operated the device upon the surface of the at least two plastic sheets A in any design or pattern as chosen by the user. While the linear heat sealing device 10 has been particularly shown and described with reference to a preferred embodiment thereof, it will be understood by those skilled in the art that changes in form and detail may be made therein without departing from the spirit and scope of the invention.

What is claimed is:

1. A hand-held linear heat sealing device to fuse at least two plastic or vinyl sheets together along a linear seam, said linear heat sealing device comprising:
   a contact bar defining a front end, a rear end, a flat lower surface and an upper surface;
   a preheating base attached upon said upper surface of said contact bar at said front end, said preheating base defining an upper surface, a lower surface a front end and a rear end;
   a first insulator block attaching a front surface to said rear end of said preheating base and upon said upper surface of said contact bar, said first insulator block defining an upper element bore, an intersecting axial bore, said first insulator block further defining a rear surface;
   a heat base attaching upon said upper surface of said contact bar defining a front heating core cavity aligned with said axial bore of said first insulator block, said heat base defining a rear temperature probe cavity, an upper surface and a rear surface;
   a second insulator block defining a front surface, a rear surface, an upper element bore intersecting an axial bore, said axial bore aligning said rear temperature bore cavity of said heat base;
   a cooling base having a lower surface attached upon said upper surface of said contact plate, said cooling base defining an upper cooling exchange platform;
   a heating element contained within said front heating core cavity extending wiring contacts through said axial bore into said upper element bore of said first insulator block;
   a temperature probe contained within said rear temperature probe cavity extending electrical wiring from said temperature probe through said axial bore into said upper element bore of said second insulator block;
   an insulating strip extending from said first insulator block to said second insulator block over said upper surface of said heat base;
   a thermoelectric cooling device (TCD), or Peltier device, having an upper surface providing heat transferred by a top bar to said preheating base, a lower surface providing a cold temperature to said upper cooling exchange platform of said cooling base, said TCD attaching a pair of wiring extension to an available power supply;

said top bar extending over said preheating base, said insulating strip and over said cooling base; and a temperature controller wired to said wiring contacts of said heating element and said electrical wiring of said temperature probe, said temperature controller controlling, monitoring and adjusting the temperature of said heat base through said heating element, wherein said linear heat sealing device provides said lower surface of said contact bar with a pre-heating zone where said plastic or vinyl sheet become soft and tacky, a heating zone, where said plastic or vinyl sheets are melted together to complete fusion of said plastic or vinyl sheets, and a cooling zone, where said fused plastic or vinyl sheets are cooled down a hardened finished state.

2. The linear heat sealing device of claim 1, wherein:

said thermoelectric cooling device (TCD) uses a Peltier effect to create a heat flux between the junction of two different types of material;

said TCD is a solid-state active heat pump which transfers heat from one side of the device to the other, with consumption of electrical energy, depending on the direction of current; and the function of said TCD is to cool said cooling base at a temperature low enough to halt melting and fusion generated by said heat base which fuses said at least two plastic sheets along a common linear axis, said TCD preferred over other cooling means due to having has no moving parts, no circulating fluids, having a long useful life, invulnerability to leaks, having a small size and providing a flexible shape, suited for application within said linear heat sealing device , said TCD independently connected to electrical power.

3. The linear heat sealing device of claim 1, wherein:

said heating element is retained within said front heating core cavity by at least one core pin, further transferring heat from said heat core to said heat base.

4. The linear heat sealing device of claim 1, wherein:

said at least two plastic or vinyl sheets includes any fusible plastic, vinyl, polymeric or other sheet materials that can be heat fused together along a linear seam, regardless of thickness, texture or composition of said materials, a regardless of whether they contain a fabric content including cotton, wool, nylon, rayon, natural or synthetic material coated with said fusible plastic, vinyl, polymeric or other fusible sheet material; and said temperature controller provides a variable temperature dependent upon the composition of the fusible sheet material regulating said temperature of said heat base to avoid damage to said fusible sheet material, yet hot enough to supply fusion to said at least two plastic or vinyl sheets.

* * * * *